United States Patent [19]

Helmer et al.

[11] Patent Number: 5,491,209
[45] Date of Patent: Feb. 13, 1996

[54] LATEX COPOLYMERS FOR PAPER COATING COMPOSITIONS

[75] Inventors: Bradley J. Helmer; Shirley J. Loughney; Jon MacDonagh-Dumler, all of Midland, Mich.

[73] Assignee: The Dow Chemical Company, Midland, Mich.

[21] Appl. No.: 207,007

[22] Filed: Mar. 7, 1994

Related U.S. Application Data

[63] Continuation-in-part of Ser. No. 864,748, Apr. 7, 1992, abandoned, which is a continuation-in-part of Ser. No. 426,244, Oct. 25, 1989, abandoned.

[51] Int. Cl.$^6$ .................................................. C08F 20/26
[52] U.S. Cl. ................ 526/320; 526/329.1; 526/318.44; 526/318.25
[58] Field of Search ................ 526/320, 318.6, 526/318.4, 318.25, 329.1, 329.2, 329.3, 335, 340, 343, 344, 341

[56] References Cited

U.S. PATENT DOCUMENTS

| | | | |
|---|---|---|---|
| 4,003,870 | 1/1977 | Gibson et al. | 524/311 |
| 4,265,977 | 5/1981 | Kawamura et al. | 428/511 |
| 4,440,896 | 4/1984 | Schuppiser et al. | 524/458 |
| 4,587,290 | 5/1986 | Davies et al. | 524/558 |
| 4,613,650 | 9/1986 | Sekiya et al. | 524/828 |
| 4,717,502 | 1/1988 | Schmid | 524/556 |

FOREIGN PATENT DOCUMENTS

| | | |
|---|---|---|
| 62-169868 | 7/1987 | Japan . |
| 87-80739 | 10/1988 | Japan . |

*Primary Examiner*—Jeffrey T. Smith

[57] ABSTRACT

The present invention relates to a copolymer comprising in polymerized form from about 1 to about 15 weight percent of one or more ethylenically unsaturated poly(ethylene glycol) monomers represented by the following formula:

$$R^1-\overset{O}{\overset{\|}{C}}-(OCH_2CH_2)_n-R$$

where $R^1$ is an ethylenically unsaturated functional group, R is H, OH or $OCH_3$, and n is from 3 to 20, and from about 60 to about 99 weight percent of one or more monovinyl aromatic monomers, one or more aliphatic conjugated diene monomers or a mixture thereof. Paper coating compositions comprising this copolymer impart improved sheet gloss and dry pick characteristics to the coated paper.

12 Claims, No Drawings

LATEX COPOLYMERS FOR PAPER COATING COMPOSITIONS

CROSS-REFERENCE TO RELATED APPLICATION

This is a continuation-in-part of application Ser. No. 07/864,748, filed Apr. 7, 1992, now abandoned, which is a continuation-in-part of application Ser. No. 07/426,244, filed Oct. 25, 1989, now abandoned. Both of the aforementioned applications are hereby incorporated by reference.

BACKGROUND OF THE INVENTION

1. Field of the Invention

This invention is related to copolymers for use in paper coating formulations to improve and optimize paper properties such as sheet gloss, ink gloss and smoothness, to a process for the preparation of the copolymers and to paper coating compositions.

2. Prior Art

Paper coating formulations which comprise latex copolymers are used extensively by the paper industry. Improvements in properties such as sheet gloss, ink gloss and smoothness are continuously sought after through the development of new latexes for inclusion in paper coating formulations.

Coated cellulosic web or paper web is prepared utilizing a pigment, such as clay, and other components which stabilize and disperse the pigment in a water slurry. The slurry is formulated with a binder to produce the coating color, a paper coating composition which is used to coat the web or paper. The components of the coating color contribute to the performance of the process of coating the web, and to the performance of the coated paper. If the paper is a higher quality grade paper, the finished coated web should have a high degree of brightness, smoothness and gloss, as well as a good finish and feel after the web is calendered.

The coating color must have sufficient strength and binding capability to enable printing of the coated paper without "picking", i.e., without the coating separating from either the paper surface or from within the coating.

U.S. Pat. No. 4,440,896, discloses the use of water-soluble polymers of ethylene glycol in binder formulations comprising a latex.

U.S. Pat. No. 4,717,502, discloses the use of polyethylene glycol in aqueous optical brightener compositions.

Japanese Kokai No. 62-169868 discloses the use of acrylate polyethylene glycol polymers in paint formulations.

It would be desirable to have new latexes which provide improved physical characteristics for paper coating formulations and coating colors without the prior art disadvantages associated with admixture of polyethylene glycols therein.

SUMMARY OF THE INVENTION

The present invention relates to a copolymer comprising in polymerized form:

(a) from about 1 to about 15 weight percent of one or more ethylenically unsaturated poly(ethylene glycol) monomers represented by the following formula:

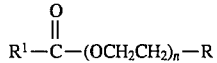

where $R^1$ is an ethylenically unsaturated functional group; R is H, OH or $OCH_3$; and n is from 3 to 20;

(b) from about 60 to about 99 weight percent of one or more monovinyl aromatic monomers, one or more aliphatic conjugated diene monomers or a mixture thereof; and (c) from 0 to about 39 weight percent of one or more (meth)acrylate monomers, vinylidene halide monomers, vinyl halide monomers, vinyl esters of carboxyl acids containing from 1 to 18 carbon atoms, (meth)acrylonitrile monomers, monoethylenically unsaturated carboxylic acid monomers, or a mixture thereof.

The above-mentioned copolymer may be used in an aqueous latex wherein the latex solids comprise:

(a) from about 10 to 100 weight percent of a ethylenically unsaturated poly(ethylene glycol)-containing copolymer;

(b) from 0 to about 90 weight percent of one or more copolymers other than (a).

Within the scope of the instant invention is a process for the preparation of a latex comprising emulsion polymerizing a polymerization mixture comprising:

(a) from about 1 to about 15 weight percent of one or more ethylenically unsaturated poly(ethylene glycol) monomers represented by the following formula:

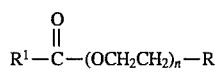

where $R^1$ is an ethylenically unsaturated functional group; R is H, OH or $OCH_3$; and n is from 3 to 20;

(b) from about 60 to about 99 weight percent of one or more monovinyl aromatic monomers, one or more aliphatic conjugated diene monomers or a mixture thereof; and (c) from 0 to about 39 weight percent of one or more (meth)acrylate monomers, vinylidene halide monomers, vinyl halide monomers, vinyl esters of carboxyl acids containing from 1 to 18 carbon atoms, (meth)acrylonitrile monomers, monoethylenically unsaturated carboxylic acid monomers, or a mixture-thereof.

In a further embodiment the instant invention relates to a paper coating composition comprising:

(1) a copolymer comprising in polymerized form:

(a) from about 1 to about 15 weight percent of one or more ethylenically unsaturated poly(ethylene glycol) monomers represented by the following formula:

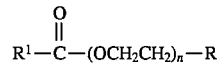

where $R^1$ is an ethylenically unsaturated functional group; R is H, OH or $OCH_3$; and n is from 3 to 20;

(b) from about 85 to about 99 weight percent of one or more monovinyl aromatic monomers, aliphatic conjugated diene monomers, (meth)acrylate monomers, vinylidene halide monomers, vinyl halide monomers, vinyl esters of carboxyl acids containing from 1 to 18 carbon atoms, (meth)acrylonitrile monomers, monoethylenically unsaturated carboxylic acid monomers, or a mixture thereof; and mixed therewith (2) one or more pigments.

A preferred embodiment is a paper coating composition comprising:

(1) a copolymer comprising in polymerized form:
(a) from about 1 to about 15 weight percent of one or more ethylenically unsaturated poly(ethylene glycol) monomers represented by the following formula:

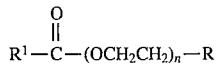

where $R^1$ is an ethylenically unsaturated functional group; R is H, OH or $OCH_3$; and n is from 3 to 20;
(b) from about 60 to about 99 weight percent of one or more monovinyl aromatic monomers, aliphatic conjugated diene monomers or a mixture thereof; and
(c) from 0 to about 40 weight percent of one or more (meth)acrylate monomers, vinylidene halide monomers, vinyl halide monomers, vinyl esters of carboxyl acids containing from 1 to 18 carbon atoms, (meth)acrylonitrile monomers, monoethylenically unsaturated carboxylic acid monomers, or a mixture thereof; and mixed therewith
(2) one or more pigments.

Either of the aforementioned paper coating compositions may further comprise:
(3) one or more binders; or
(4) one or more stabilizing agents; or
(5) a defoamer; or
(3) and (4), (3) and (5), (4) and (5), or (3), (4) and (5).

Within the scope of the instant invention is a process for the preparation of a paper coating composition comprising mixing in a fluid medium:

(1) a copolymer comprising in polymerized form:
(a) from about 1 to about 15 weight percent of one or more ethylenically unsaturated poly(ethylene glycol) monomers represented by the following formula:

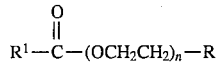

where $R^1$ is an ethylenically unsaturated functional group; R is H, OH or $OCH_3$; and n is from 3 to 20;
(b) from about 85 to about 99 weight percent of one or more monovinyl aromatic monomers, aliphatic conjugated diene monomers, (meth)acrylate monomers, vinylidene halide monomers, vinyl halide monomers, vinyl esters of carboxyl acids containing from 1 to 18 carbon atoms, (meth)acrylonitrile monomers, monoethylenically unsaturated carboxylic acid monomers, or a mixture thereof; and mixed therewith
(2) one or more pigments. Desirably, the fluid medium comprises water.

This process may further comprise mixing into the paper coating composition in any order:
(3) one or more binders; or
(4) one or more stabilizing agents; or
(5) a defoamer; or
(3) and (4), (3) and (5), (4) and (5), or (3), (4) and (5).

DETAILED DESCRIPTION OF THE INVENTION

In preferred embodiments of the latex copolymer of the instant invention and the process for its preparation $R^1$ is a vinyl group or a propenyl group, n is from 7 to 15 and R is OH.

It is desirable that the ethylenically unsaturated poly(ethylene glycol) monomer be present in the latex copolymer in an amount between about 1 and about 15 weight percent, preferably between about 5 and about 10 weight percent.

The comonomers and mixtures of comonomers which are suitably employed with the ethylenically unsaturated poly(ethylene glycol) monomers in the present invention include monovinyl aromatic monomers; aliphatic conjugated diene monomers; (meth)acrylate monomers; vinylidene halide or vinyl halide monomers; vinyl esters of carboxylic acids containing from 1 to 18 carbon atoms, such as vinyl acetate or vinyl stearate; methacrylonitrile, and acrylonitrile. A monoethylenically unsaturated carboxylic acid monomer may also be used. Monovinyl aromatic monomers and aliphatic conjugated diene monomers are preferred.

The use herein of the prefix "(meth)" with generic terms, such as, for example, "acrylic acid", or "acrylate" is meant to broaden the terms to include both acrylate and methacrylate species. Thus, the term "(meth)acrylic acid monomer" includes acrylic acid and methacrylic acid.

The term "monovinyl aromatic monomer" as used herein, is meant to include those monomers with a radical of the formula:

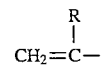

(wherein R is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. Examples include styrene, alpha methyl styrene, p-methyl styrene, t-butyl styrene, vinyltoluene, and halogenated styrene. The preferred monomer is styrene.

Typically the effective amount of monovinyl aromatic comonomer present with the ethylenically unsaturated poly(ethylene glycol) monomers will depend on whether (i) the ethylenically unsaturated poly(ethylene glycol)-containing latex copolymer is acting alone as a binder or (ii) the ethylenically unsaturated poly(ethylene glycol)-containing latex is blended with a latex conventionally known to be useful as a binder. For those latexes of the present invention which are used as binding latexes, the typical range for monovinyl aromatic comonomer present will be from about 70 to about 30 weight percent based on the total weight of monomer present. The latexes of the present invention which are mixed with binding latexes have more flexible ranges for monovinyl aromatic comonomer levels. For example, if the latexes of the present invention are intended to function as plastic pigments in a paper coating formulation then the amount of monovinyl aromatic monomer present may be up to about 95 percent based on total weight of monomer present.

The term "aliphatic conjugated diene", as used herein, is meant to include comonomer compounds such as isoprene, 1,3-butadiene, 2-methyl-1,3-butadiene, piperylene (1,3-pentadiene), and other hydrocarbon analogs of 1,3-butadiene. Typically the amount of aliphatic conjugated diene monomer present with the poly(ethylene glycol) comonomer will depend on monomers chosen, however, if a monovinyl aromatic monomer is a comonomer, the typical range will be from about 30 to about 70 weight percent aliphatic conjugated diene based on the total weight of the comonomers present. The latexes of the present invention which are mixed with binding latexes have more flexible ranges for aliphatic conjugated diene levels.

Vinylidene halide and vinyl halide monomers are also suitable for this invention which can include the preferred vinylidene chloride and vinyl chloride monomers. Vinylidene bromide and vinyl bromide can also be employed.

The term (meth)acrylate as used herein is meant to include both the families of acrylate and methacrylate comonomers. The acrylates can include acids, esters, amides, and substituted derivatives thereof. Generally, the more desirable (meth)acrylates are $C_1$–$C_8$ alkyl acrylates or methacrylates. Examples of such acrylates include butyl acrylate, hexyl acrylate, 2-ethyl hexyl acrylate, tert-butyl acrylate, methylmethacrylate, butylmethacrylate, ethyl methacrylate, hexylmethacrylate, isobutylmethacrylate and isopropylmethacrylate. The preferred (meth)acrylates are butyl acrylate and methylmethacrylate.

The amount of (meth)acrylate present with the poly(ethylene glycol) comonomer will depend on the monomer chosen. However, the desirable range will be from about 0 to about 95 weight percent based on the total weight of monomer present.

The term "monoethylenically unsaturated carboxylic acid monomer", as used herein, is meant to include those monocarboxylic monomers such as acrylic acid and methacrylic acid; dicarboxylic monomers such as itaconic acid, fumaric acid, maleic acid, and their monoesters.

The amount of monoethylenically unsaturated carboxylic acid comonomer present is that amount necessary to enhance stability of the latex particle. Although the present latex particle may be sufficiently stable without the carboxylic acid comonomer present, a typical stabilizing amount is from about 2 to about 10 weight percent based on the total weight of monomer present in the copolymer.

The ethylenically unsaturated poly(ethylene glycol) monomers are represented by the following formula:

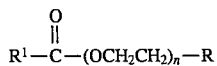

where $R^1$ is an ethylenically unsaturated functional group; R is H, OH or $OCH_3$; and n is from 3 to 20, and preferably 5 to 10.

The preferred ethylenically unsaturated poly(ethylene glycol) monomers are where $R^1$ is a vinyl group or propenyl and n is 7 to 15 and R is OH.

The $R^1$ group is meant to act as the functional group through which the monomers link to form the polymer chain and various options for $R^1$ will be readily ascertained by a skilled artisan.

Although not wishing to be bound by any particular theory of operation of the instant invention, it is thought that the ethylenically unsaturated poly(ethylene glycol) acts as a functional group which interacts with inorganic pigments such as clay in the coating color. By interacting with the clay, the coating color is thought to improve the gloss of the paper without sacrificing the strength and binding capability.

The effective qualitative amount of poly(ethylene glycol) monomer present in the copolymer of the present invention is typically between 1 and 15 weight percent. A preferred amount of poly(ethylene glycol) monomer present in the copolymer is between about 5 and about 10 weight percent.

Typically, conventionally known binders can be suitably blended with the poly(ethylene glycol)-containing copolymers or with latexes containing the copolymers in paper coating compositions of the instant invention. Such binders include the natural binders: starch; modified starch such as oxidized, enzyme converted or hydroxy-ethylated starch; soy bean protein, casein and the like as well as the synthetic binders. The synthetic binders include the styrene-butadiene latexes and the like. The binder may also be a mixture of various binding materials.

The ethylenically unsaturated poly(ethylene glycol)-containing copolymers, and latexes containing these copolymers (herein referred to as poly(ethylene glycol)-containing copolymer latexes, or simply as copolymer latexes), can be blended with such conventional binding latexes typically in an amount up to 50 weight percent. Preferably, the latex blend contains from about 10 weight percent to about 50 weight percent poly(ethylene glycol)-containing copolymer latex with the balance being the binder latex. The preferred amount of poly(ethylene glycol)-containing copolymer latex is between from about 20 weight percent to about 45 weight percent. The most preferred amount is about 25 weight percent ethylenically unsaturated poly(ethylene glycol)-containing copolymer latex.

The Paper Coating Formulation

The coating color typically comprises 100 parts pigment containing from about 65 to about 100 parts clay; and 0 to about 35 parts secondary pigment; about 0.01 to about 0.5 parts dispersing or stabilizing agent; 0.5 to about 25 parts of ethylenically unsaturated poly(ethylene glycol)-containing copolymer latex; 0 to about 25 parts co-binder; 0 to about 0.2 parts defoamer and sufficient amounts of water to provide the desired solids level, usually about 35 to 70 weight percent solids. The modifications and formulations of the coating color are within the knowledge of a person of ordinary skill in the art.

The inorganic or mineral pigments with which the poly(ethylene glycol)-containing copolymer latex particle interacts can be chosen from the finely divided clays (particularly kaolin types); calcium carbonate; titanium dioxide; satin white and the like. Pigmentary materials such as talc; blanc fixe; ocre; carbon black and aluminum can also be employed.

The paper coating composition, also known as a coating color, can be applied to the paper substrate by conventional techniques such as air knife, trailing blade, inverted blade, roll coater, short dwell coater and the like.

The substrate is then dried and the paper may then be calendered or super calendered depending on the quality grade of the paper being produced.

The paper-coating properties which illustrate the utility of the present invention, include but are not limited to, dry pick and sheet gloss. Sheet gloss is often achieved by sacrificing dry pick (how well the coating is bound to the paper). The present invention enables the paper coating to maintain dry pick and simultaneously increase sheet gloss. The paper is analyzed for the properties of sheet gloss and pick strength using the following methods:

The pick resistance of the paper is tested by using the TAPPI standard method T 499-su-64 with a Westvaco Rod Applicator. The specular gloss of paper at 75 degrees is tested using the TAPPI standard method T 480-os-78.

Examples of Ethylenically Unsaturated Poly(ethylene glycol) Monomer-Containing Copolymers in Formulations with Binder Latexes.

EXAMPLE 1

1. An ethylenically unsaturated poly(ethylene glycol) monomer-containing copolymer latex is prepared in the following manner. Into a 1-gallon pressurized stainless steel reactor is added 813 grams (g) of water, 1.23 g of a 45 percent active surfactant solution, 0.89 g of 10 percent sulfuric acid, 11.1 g of a 1 percent active aqueous pentasodium diethylene triamine pentaacetate solution and 26.35 g of a seed latex which will render a particle size having a diameter of approximately 1400 Å. The reactor is purged with nitrogen and heated to 90° C. and over a 5-hour period is added a monomer stream containing: 530 g of butadiene; 140 g of the ethylenically unsaturated poly(ethylene glycol) monomer which is α-(2-methyl-1-oxo-2-propenyl)-ω-hydroxy-poly(oxy- 1,2-ethanediyl), having approximately 20 ethylene oxide units (hereinafter "HEM 20") commercially available from Alcolac as a poly(ethylene glycol) monomethacrylate; 9.0 g of a mercaptan chain-transfer agent; and 726 g of styrene. Simultaneously added with the monomer stream, is added: 485 g of water; 24.26 g of a 45 percent active surfactant solution; 24 g of a 10 percent solution of sodium hydroxide and 19 g of sodium persulfate. Following the addition of the monomer and aqueous streams, the reactor is maintained at 90° C. for about 1 hour, then cooled.

A paper coating formulation is prepared by the following method. A sufficient amount of water to make a 72 percent slurry of 2000 grams dry No. 1 Coating Clay and 0.1 part sodium polyacrylate as a dispersant is added to a blender. Approximately two thirds of the total clay is added to the blender and the blender is run on low speed until the clay is wetted. The remaining clay is added and run on low speed until all the clay is wetted. The pigment is then dispersed on high speed for one minute.

100 Grams of the pigment slurry is put into an eight ounce bottle to which the latex binder is added. The coating compound is stirred with an air stirrer at a speed which will not induce a vortex, for approximately 3 to 5 minutes. The pH of the formulation is then adjusted to about 8.5 to about 9 with ammonium or sodium hydroxide while hand stirring the formulation.

The paper, or basestock to which the coating formulation is applied is a 28 lb. per 3300 ft.$^2$ groundwood containing publication stock. The basestock is coated on a Dow Bench Blade Coater manufactured by Modern Metalcraft of Midland, Mich. A 12 inch web is coated at approximately 12 ft. per minute using a puddle blade coater with drying on a heated steel drum. Circulating glycol at 205° F.–215° F. through the drum is sufficient for heating. After the paper is dried samples are cut into sizes appropriate for testing.

The latex binder is comprised of 75 percent of a carboxylated styrene/butadiene copolymer-containing binder latex and 25 percent of the ethylenically unsaturated poly(ethylene glycol) monomer-containing copolymer latex prepared above. The sheet gloss for the paper coated with the coating color formulation is 62 and the dry pick is 225.

EXAMPLES 2–5

2. A similar coating color is prepared using a latex prepared similarly to the latex prepared in Example 1; however, the ethylenically unsaturated poly(ethylene glycol) monomer-containing copolymer latex is prepared with 5 parts of α-(2-methyl-1-oxo-2-propenyl)-ω-hydroxy-poly-(oxy- 1,2-ethanediyl), having approximately 10 ethylene oxide units (hereinafter "HEM 10") commercially available from Alcolac as a poly(ethylene glycol) monomethacrylate, based on weight of total monomer and the coating color is prepared with 75 percent of a carboxylated styrene/butadiene copolymer-containing binder latex and 25 percent of the HEM 10-containing latex. The sheet gloss for the paper coated with the coating color formulation is 61 and the dry pick is 206.

3. A similar coating color is prepared using a latex prepared similarly to the latex prepared in Example 1; however, the ethylenically unsaturated poly(ethylene glycol) monomer-containing copolymer latex is prepared with 10 parts HEM 10 based on weight of total monomer and the coating color is prepared with 75 percent of a carboxylated styrene/butadiene copolymer-containing binder latex and 25 percent of the HEM 10 latex. The sheet gloss for the paper coated with the coating color formulation is 64 and the dry pick is 222.

4. A similar coating color is prepared using a latex prepared similarly to the latex prepared in Example 1; however, the ethylenically unsaturated poly(ethylene glycol) monomer-containing copolymer latex is prepared with 15 parts HEM 10 based on weight of total monomer present and the coating color is prepared with 75 percent of a carboxylated styrene/butadiene copolymer-containing binder latex and 25 percent of the HEM 10 latex. The sheet gloss for the paper coated with the coating color formulation is 65 and the dry pick is 195.

5. A similar coating color is prepared using a latex prepared similarly to the latex prepared in Example 1; however, the ethylenically unsaturated poly(ethylene glycol) monomer-containing copolymer latex is prepared with 10 parts HEM 10 based on weight of total monomer present and the coating color is prepared with 50 percent of a carboxylated styrene/butadiene copolymer-containing binder latex and 50 percent of the HEM 10 latex. The sheet gloss for the paper coated with the coating color formulation is 65 and the dry pick is 210.

Comparative Example

A similar coating color is prepared using a carboxylated styrene/butadiene copolymer-containing binder latex alone. The sheet gloss for the paper coated with the coating color formulation of the Comparative Example is 57 and the dry pick is 188 as compared to a more desirable sheet gloss of 65 and dry pick of 210 as demonstrated in Example 5.

The foregoing data illustrate the desirable increase in sheet gloss and dry pick the paper exhibits when the ethylenically unsaturated poly(ethylene glycol) monomer-containing copolymer latexes are incorporated into the coating color.

What is claimed is:

1. A copolymer comprising in polymerized form:

(a) from about 1 to about 15 weight percent of one or more ethylenically unsaturated poly(ethylene glycol) monomers represented by the following formula:

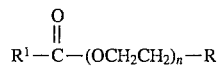

where $R^1$ is an ethylenically unsaturated functional group; R is H, OH or $OCH_3$; and n is from 3 to 20;

(b) from about 60 to about 99 weight percent of a mixture of 1,3-butadiene and one or more monovinyl aromatic monomers; and (c) from 0 to about 39 weight percent of one or more (meth)acrylate monomers, vinylidene halide monomers, vinyl halide monomers, vinyl esters of carboxyl acids containing from 1 to 18 carbon atoms, (meth- )acrylonitrile monomers, monoethylenically unsaturated carboxylic acid monomers, or a mixture thereof.

2. The copolymer of claim 1 wherein $R^1$ is a vinyl group or a propenyl group, n is from 7 to 15 and R is OH.

3. The copolymer of claim 2 wherein the ethylenically unsaturated poly(ethylene glycol) monomer is present in the copolymer in an amount between about 5 and about 10 weight percent.

4. The copolymer of claim 1 wherein (b) is from about 85 to about 99 weight percent of the copolymer, and the monovinyl aromatic monomer is styrene.

5. The copolymer of claim 1 wherein R is OH.

6. The copolymer of claim 1 wherein R is H.

7. The copolymer of claim 1 wherein R is $OCH_3$.

8. The copolymer of claim 1 wherein n is from 7 to 15.

9. The copolymer of claim 1 wherein $R^1$ is a vinyl group.

10. The copolymer of claim 1 wherein $R^1$ is a propenyl group.

11. The copolymer of claim 1 wherein the ethylenically unsaturated poly(ethylene glycol) monomer is present in the latex copolymer in an amount between about 5 and about 10 weight percent.

12. The copolymer of claim 1 wherein component (c) comprises one or more (meth)acrylate monomers, vinyl esters of carboxyl acids containing from 1 to 18 carbon atoms, (meth)acrylonitrile monomers, monoethylenically unsaturated carboxylic acid monomers, or a mixture thereof.

* * * * *